United States Patent [19]

Kuczynski et al.

[11] Patent Number: 5,527,833
[45] Date of Patent: Jun. 18, 1996

[54] PROCESS FOR PRODUCING A POLYURETHANE FOAM

[75] Inventors: Edward T. Kuczynski, Troy; Michael J. Cicone, Clinton Township, both of Mich.

[73] Assignee: Woodbridge Foam Corp., Mississauga, Canada

[21] Appl. No.: 475,479

[22] Filed: Jun. 7, 1995

[51] Int. Cl.$^6$ ............................................... C08G 18/00
[52] U.S. Cl. ........................ 521/155; 521/172; 521/174
[58] Field of Search ................................. 521/155, 172, 521/174

[56] References Cited

U.S. PATENT DOCUMENTS

| | | | |
|---|---|---|---|
| 4,078,837 | 3/1978 | Auth | 293/71 |
| 4,134,610 | 1/1979 | Lindewall | 293/71 |
| 4,197,372 | 4/1980 | Hostettler | 521/109 |
| 4,209,593 | 6/1980 | Khanna | 521/163 |
| 4,237,240 | 12/1980 | Jarre et al. | 521/159 |
| 4,247,656 | 1/1981 | Janssen | 521/174 |
| 4,362,825 | 12/1982 | Grabhoefer et al. | 521/172 |
| 4,438,252 | 3/1984 | Carroll et al. | 528/75 |
| 4,451,587 | 5/1984 | Keshi et al. | 521/171 |
| 4,722,946 | 2/1988 | Hostettler | 521/158 |
| 4,771,083 | 9/1988 | Altounian | 521/159 |
| 5,032,622 | 7/1991 | Herrington et al. | 521/99 |
| 5,143,941 | 9/1992 | Rossio et al. | 521/51 |
| 5,167,884 | 12/1992 | Rossio et al. | 264/45.5 |
| 5,183,830 | 2/1993 | Möhring et al. | 521/107 |
| 5,286,761 | 2/1994 | Naujoks et al. | 521/172 |
| 5,302,634 | 4/1994 | Mushovic | 523/219 |
| 5,369,147 | 11/1994 | Mushovic | 523/219 |

OTHER PUBLICATIONS

Polyurethane Handbook, 2nd Edition, Günter Oertel, Chapters 3, 5 and 7, pp. 70, 234–245, 364–386, (1993).

Primary Examiner—Morton Foelak
Attorney, Agent, or Firm—Fitzpatrick, Cella, Harper & Scinto

[57] ABSTRACT

A process for producing a polyurethane foam includes the steps of (a) providing a substantially uniform mixture having an isocyanate, an active hydrogen-containing compound, a blowing agent, and a catalyst to form a reaction mixture, and (b) expanding the reaction mixture to produce the polyurethane foam. The active hydrogen-containing compound has from about 50 to 100 parts-by-weight of a first active hydrogen-containing compound having an equivalent weight of from about 200 to about 800 and from 0 to about 50 parts-by-weight of a second active hydrogen-containing compound. The average equivalent weight of the active-hydrogen containing compound is in the range of from about 150 to about 700.

8 Claims, 3 Drawing Sheets

PROCESS FOR PRODUCING A POLYURETHANE FOAM

BACKGROUND OF THE INVENTION

1. Field of the Invention

The present invention relates to a polyurethane foam and to a process for production thereof. More particularly, the present invention relates to a polyurethane foam, inter alia, having superior energy absorbance, efficiency and other improved properties compared to prior art polyurethane foams.

2. Description of the Prior Art

It is known in the art that polyurethane foams have energy absorbing properties. Thus, heretofore, such foams have been used in helmets, shoe insoles, furniture, seating applications and the like. These foams have also found widespread use in vehicular applications such as door panels, knee bolsters, air bag doors, headliners, bumpers, instrument panels, sun visors and other areas of the vehicle intended to absorb energy upon impact.

Known energy absorbing polyurethane foams can be divided generally into two groups: recoverable foams and crushable foams.

Recoverable foams are generally resilient in nature and will recover in response to repeated impact with little or no loss in memory. The principal advantage of these foams is that they do not need to be replaced after impact. However, in order to gain this advantage, it is necessary to compromise properties such as energy absorption and efficiency, and thus, it is generally accepted that these foams have a reduced energy absorption and efficiency.

Crushable foams are generally rigid and will permanently crush and/or disintegrate in response to an impact. Energy absorption occurs as a result of damage to the cell structure of the foam during impact. See, for example, U.S. Pat. Nos. 5,143,941 and 5,167,884 (both to Rossio etal.), the contents of each of which is hereby incorporated by reference. The principal advantage of these foams is that they possess relatively high energy absorption and efficiency. However, a disadvantage of these foams is that they need to be replaced after impact due to the internal damage to the foam resulting from impact. Another significant, yet generally unreported, disadvantage of these foams is that the force or compressive loads that they can endure are relatively independent of impact velocity. Consider, for example, a particular crushable foam which is designed to absorb the energy of a compressive force of 28 p.s.i. at a deflection (relative penetration depth) of 50% and an impact velocity of 15 m.p.h. If the impact velocity is decreased, the compressive force is substantially unchanged and the result is a foam that feels harder on impact leading to potentially dangerous consequences for a passenger in the vehicle. If the impact velocity is increased, there is an increased likelihood that the foam will fail since it was designed to absorb energy at a lower impact velocity.

In in the 1995 Edition of "EMERGING ISSUES IN MOTOR VEHICLE PRODUCT LIABILITY LITIGATION" by the American Bar Association, Section of Tort and Insurance Practice Committee on Automobile Law, Chapter C thereof is a paper entitled "Some Considerations Relating to Side Impact Occupant Protection and Compliance with FMVSS 214" by Geoffrey J. Germane, Ph.D. In this paper, the contents of which are hereby incorporated by reference, Dr. Germane, inter alia, states:

"Padding concepts have been studied for decades using sled tests, crash tests, other laboratory tests and mathematical models in an attempt to determine optimum pad characteristics and placement for dummy acceleration reduction. Numerous padding materials and configurations have been researched resulting in greater understanding of the tradeoffs between energy absorption, stiffness, and expected injury levels in side impacts at various velocities. Padding designed to optimize energy absorption could increase low speed injury due to relatively high compression forces. The ideal pad, with compression forces proportional to compression speed gives lowest relative forces levels over the widest range in contact speeds. Such padding is not presently available as a homogeneous material. Simulations of ideal pad characteristics with mechanical systems are theoretically possible but would not be practical for production vehicles even if reliable examples could be built." (emphasis added)

Dr. Germane's paper is instructive since it describes the state of the art (the paper was presented in March 1995) and it indicates that, notwithstanding prior art energy absorbing padding (including polyurethane foams), for all practical purposes there does not exist a material which is capable of absorbing compressive forces directly proportional to impact or compression velocity.

In light of these difficulties in the prior art, it would be advantageous to have a polyurethane foam having improved energy absorbing properties, including: recoverability, relatively high energy absorbance and efficiency, and the capability of absorbing compressive forces directly proportional to impact or compression velocity.

SUMMARY OF THE INVENTION

It is an object of the present invention to provide a novel polyurethane foam which obviates or mitigates one or more of the above-identified deficiencies of the prior art.

It is an object of the present invention to provide a novel process for producing such a polyurethane foam.

Accordingly, in one of its aspects, the present invention provides a recoverable, polyurethane foam which, upon impact, will exhibit the following properties: (i) an energy absorption of at least about 85% when energy absorption is calculated according to the following formula $$\frac{(I.V.)^2 - (R.V.)^2}{(I.V.)^2}$$

wherein I.V. is impact velocity and R.V. is rebound velocity; (ii) an efficiency of at least about 50%, wherein efficiency is defined as a percent fraction of a ratio of a square wave to the area under a curve obtained by plotting compressive force versus relative penetration depth during the impact; and (iii) for a given penetration depth, a ratio, of a first compressive force at an impact velocity of 15 m.p.h. to a second compressive force at an impact velocity of 0.004 m.p.h. of at least about 4. The "square wave" is obtained by multiply maximum compressive force and maximum relative penetration depth. The terms "compressive force", "compressive load", "load" and "force" are used interchangeably throughout this specification and have the same meaning. Similarly, the terms "penetration", "penetration depth" and "deflection" are used interchangeably throughout this specification and have the same meaning.

In another of its aspects, the present invention provides a process for producing a polyurethane foam comprising the steps of:

providing a substantially uniform mixture comprising an isocyanate, an active hydrogen-containing compound, a blowing agent and a catalyst to form a reaction mixture; and expanding the reaction mixture to produce the polyurethane foam;

wherein: (i) the active hydrogen-containing compound comprises from about 50 to 100 parts by weight of a first active hydrogen-containing compound having an equivalent weight of from about 200 to about 800 and from 0 to about 50 parts by weight of a second active hydrogen-containing compound; and (ii) the average equivalent weight of the active-hydrogen containing compound is in the range of from about 200 to about 700.

It has been discovered that, by judicious selection of reactants, it is possible to produce a polyurethane foam having desirable and unique combination of energy absorbing properties. Specifically, the present polyurethane foam is recoverable and has a desirable energy absorption and efficiency. Further, the present polyurethane foam is capable of absorbing a compressive or impact which is directly proportional to the compressive or impact velocity. The term "directly proportional", when used to describe the present polyurethane foam is intended to mean that the foam is capable of absorbing an increased compressive load or force as the impact velocity of the load or force is increased. To the knowledge of Applicant and, apparently corroborated by Dr. Germane, a foam having such properties is heretofore unknown.

Those of skill in the art will be able to contemplate many applications for the present polyurethane foam. These include virtually any application in which it is desired to have a foam which absorbs and/or manages energy. It is believed, however, that a particular useful application of the present polyurethane foam will be in vehicular occupant protection. Non-limiting examples of this application include: pillar covers, side door panels, arm rests, headrests, steering wheels, instrument panels, console covers, side impact bag covers, knee bolsters and the like.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
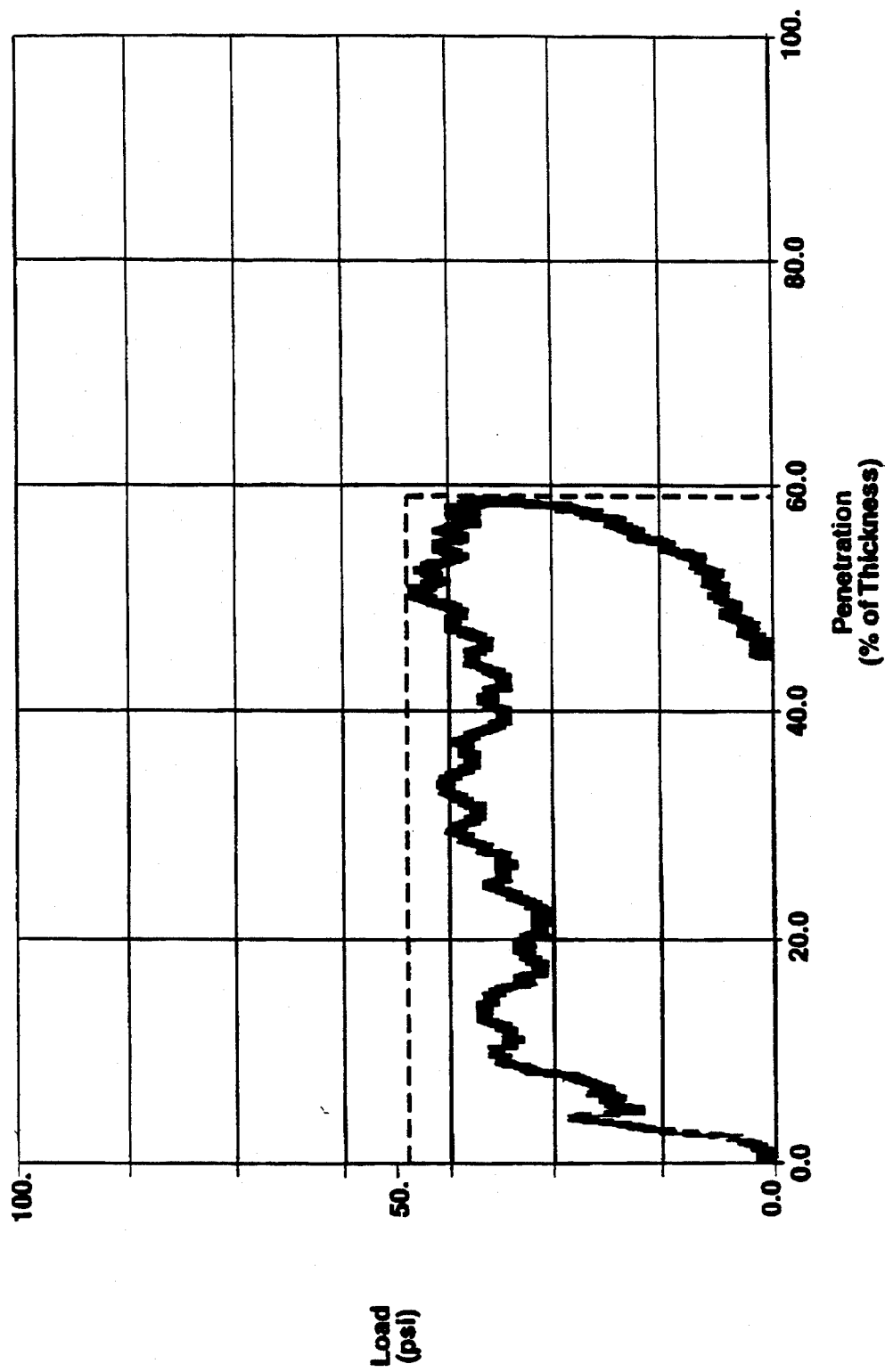
FIG. 1 is a stress-strain curve for a polyurethane foam in accordance with the present invention.

The present invention is related to, inter alia, a polyurethane foam and to a process for production thereof. As used throughout this specification, the term "polyurethane" is intended to have a broad meaning and includes polyurethane and urea-modified polyurethane. As is known in the art, the term "urea-modified", when used in conjunction with a polyurethane means that up to 50% of the polymer backbone forming linkages have been substituted with urea groups.

The process for producing the present polyurethane foam comprises the steps of:

providing a substantially uniform mixture comprising an isocyanate, an active hydrogen-containing compound, a blowing agent and a catalyst to form a reaction mixture; and expanding the reaction mixture to produce the polyurethane foam;

wherein: (i) the active hydrogen-containing compound comprises from about 50 to 100 parts by weight of a first active hydrogen-containing compound having an equivalent weight of from about 200 to about 800 and from 0 to about 50 parts by weight of a second active hydrogen-containing compound; and <ii) the average equivalent weight of the active-hydrogen containing compound is in the range of from about 200 to about 700.

The first step in the present process comprises providing a substantially uniform mixture comprising an isocyanate, an active hydrogen-containing compound, a blowing agent and a catalyst.

The isocyanate suitable for use in the substantially uniform mixture is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g. an alkylene or arylene group). Moreover, Q may be represented by the general formula:

$$Q^1-Z-Q^1$$

wherein $Q^1$ is an alkylene or arylene group and Z is chosen from the group comprising —O—, —O—$Q^1$—, —CO—, —S—, —S—$Q^1$—S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanato-cyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4,441 -triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. The prepolymer may then be reacted with a polyol to produce a polyurethane foam or an amine to produce a polyurea-modified polyurethane.

In another embodiment, the isocyanate compound suitable for use in the process of the present invention be selected from dimers and trimors of isocyanates and diisocyanates, and from polymeric diisocyanates having the general formula:

$$[Q''(NCO)_i]_j$$

wherein both i and j are integers having a value of 2 or more, and Q'' is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides ($QSO_2NCO$), cyanic acid and thiocyanic acid.

See also for example, British patent No. 1,453,258, the contents of which are incorporated herein by reference.

Non-limiting examples of suitable isocyanates include: 1,6-hexamthylene diisocyanate, 1,4-butylene diisocyante, furfurylidene diisocyante, 2,4'-diphenylmethane diisocyante, 4,4' diphenylmethane diisocyante, 4,4'-diphenylpropane diisocyante, 4,4'-diphenyl-3,3'-dimethyl methane diisocyanate, 1,5-naphthanlene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisccyanate, dianisidine diisocyanate, bitolylene diisocyanate, 1,4-xylylene diisocyanate, 1,3-xylylene diisocyanate, bis-(4-isocyanatopheny)methane, bis-(3-methyl-4-isocyanatophenyl)methane, polymethylene polyphenyl polyisocyanates and mixtures thereof.

A more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate. An example of such an isocyanate is commercially available from Imperial Chemical Industries under the tradename Rubinate M and from The Dow Chemical Company under the tradename PAPI 4027.

Preferably, The isocyanate used in the present process as a functionality in the range of from about 2.0 to about 2.7, more preferably from about 2.2 to about 2.4.

The isocyanate is used in an amount to provide an isocyanate index, inclusive of all reactive equivalents in the reaction mixture, in the range of from about 85 to about 150, more preferably from about 90 to about 120, most preferably from about 90 to about 110.

The reaction mixture in the first step in the present process further comprises an active hydrogen-containing compound. The active hydrogen-containing compound comprises from about 50 to 100 parts by weight of a first active hydrogen-containing compound having an equivalent weight of from about 200 to about 800 and from 0 to about 50 parts by weight of a second active hydrogen-containing compound. Further, the average equivalent weight of the active-hydrogen containing compound is in the range of from about 150 to about 700. Preferably, the average equivalent weight of the active hydrogen-containing compound is in the range of from about 500 to about 650, more preferably in the range of from about 550 to about 650, most preferably in the range of from about 600 to about 650.

As used throughout this specification, the term "equivalent weight" means mass of active hydrogen-containing compound per reactive hydrogen pursuant to the following formula:

Equivalent Weight=M.W./f wherein M.W. is the molecular weight of the compound and f is the number of reactive hydrogens (i.e. functionality) in a molecule of the compound. Thus, one equivalent weight of active hydrogen-containing compound will react stoichiometrically with one equivalent weight of isocyanate.

It is within the scope, and indeed a preferred aspect of, the present process that the active hydrogen-containing compound comprises a mixture of a first active hydrogen-containing compound having a relatively low equivalent weight and a second active hydrogen-containing compound having a relatively high equivalent weight. Thus, it is preferred that the first active hydrogen-containing compound have an equivalent weight in the range of from about 300 to about 800.

In order to provide an active hydrogen-containing compound having an average equivalent weight in the range of from about 200 to about 800, it has been found desirable to use a mixture of first and second active hydrogen-containing compounds as described above. Preferably, the mixture comprises from about 60 to about 90 parts by weight of the first active hydrogen-containing compound and from about 10 to about 40 parts by weight of the second active hydrogen-containing compound. More preferably, the mixture comprises from about 70 to about 80 parts by weight of the first active hydrogen-containing compound and from about 20 to about 30 parts by weight of the second active hydrogen-containing compound.

Preferably, at least one of, most preferably both of, the first and second active hydrogen-containing compounds are polyols. Beyond the equivalent weight and amount of each polyol discussed, the exact nature of each polyol is not particularly restricted. For example, the polyol can be made with one or both of ethylene oxide and propylene oxide and is a random or block polymer of one or more of polyoxypropylene diols, triols and tetrols, and ethylene oxide-capped diols, triols and tetrols. Generally, if the polyol is based on ethylene oxide, the ethylene oxide will be present in amounts of less than about 20% by weight.

The choice of such a polyol is not particularly restricted and is within the purview of a person skilled in the art. For example, the polyol may be a hydroxyl-terminated backbone of a member selected from the group comprising polyether, polyester, polycarbonate, polydiene and polycaprolactone. The polyol may selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. The polyol may also be selected from the group comprising adipic acid-ethylene glycol polyester, poly(butylene glycol), poly(propylene glycol) and hydroxyl-terminated polybutadiene—see, for example, British patent number 1,482,213 and U.S. Pat. No. 4,722,946 (to Hostettler), the contents of each of which are incorporated herein by reference. Ideally, such a polyol would contain predominantly secondary hydroxy groups.

The reaction mixture used in the first step of the present process further comprises a blowing agent. Preferably, the blowing agent is an aqueous blowing agent. As is known in the art, aqueous blowing agents, such as water, can be used as a reactive blowing agent in the production of polyurethane foam. Specifically, water reacts with the isocyanate forming carbon dioxide which acts as the effective blowing agent in the final foamed polymer product. Optionally, organic blowing agents may be used in conjunction with the aqueous blowing agent, although the use of such blowing agents is generally being curtailed for environmental considerations. It is known in the art that the amount of water used as a blowing agent in the preparation of a foamed isocyanate-based polymer is conventionally in the range of from about 0.5 to as high as about 15 or more parts by weight, preferably from about 1.0 to about 5.0 parts by weight, based on 100 parts by weight of the total active hydrogen-containing compound content in the reaction mixture. Since the amount of water used in the production of a foamed isocyanate-based polymer is limited by the fixed properties expected in the foamed polymer, it may be necessary, in certain circumstances, to utilize a substantially inert liquid extenders when high loadings of filler material are contemplated. Non-limiting examples of suitable liquid extenders include halogenated hydrocarbons, high molecular weight hydrocarbons and polyols.

The reaction mixture used in the first step of the present process further comprises a catalyst. The choice and use of such a catalyst is within the purview of a person skilled in the art. See for example U.S. Pat. Nos. 4,296,213 and 4,518,778, the contents of each of which is incorporated herein by reference. Non-limiting examples of suitable catalysts include tertiary amines and/or organometallic compounds. Of course it will be understood by those skilled in the art that a combination of two or more catalysts may be suitably used.

As will be clearly understood by those of skill in the art, it is contemplated that conventional additives in the polyurethane foam art can be used in the present process. Non-limiting examples of such additives include: surfactants e.g. organo-silicone compounds available under the tradename L-540 Union Carbide), cell openers (e.g. silicone oils), extenders (e.g. halogenated paraffins commercially available as Cereclor S45) cross-linkers (e.g. low molecular weight reactive hydrogen-containing compositions), pigments/dyes, flame retardants (e.g. halogenated organo-phosphoric acid compounds), inhibitors (e.g. weak acids), nucleating agents (e.g. diazo compounds), anti-oxidants, and plasticizers/stabilizers (e.g. sulphonated aromatic compounds). The amounts of these additives conventionally used would be within the purview of a person skilled in the art.

The manner by which the uniform mixture of isocyanate, active hydrogen-containing compound, blowing agent and catalyst is prepared in the first step of the process is not particularly restricted. Thus, it is possible to preblend the components in a separate tank which is then connected to a suitable mixing device for mixing with the aqueous blowing agent and catalyst. Alternatively, it is possible to preblend the active hydrogen-containing compound with the blowing agent, catalyst and other additives, if present. This preblend could then be fed to a suitable mixhead which would also receive an independent stream of the isocyanate.

Once the isocyanate, active hydrogen-containing compound, blowing agent and catalyst have been mixed uniformly, a reaction mixture is formed. This reaction mixture is then expanded to produce the present polyurethane foam. As will be apparent to those of skill in the art, the process of the present invention is useful in the production of slab foam, molded articles, carpet underlay and the like. Thus, as will be apparent to a person skill in the art, the manner by which expansion of the reaction mixture is effected will be dictated by the type of foam being produced.

A particular advantage of the present process is that it is very well suited to the production of molded articles having desirable, and heretofore, unknown energy absorbing properties. This advantage obviates the inherent disadvantages (e.g. high labour costs, high scrap/waste production) associated with using a slab foam production to produce shape articles.

The product of the present process is a recoverable, polyurethane foam which, upon impact, will exhibit the following properties: (i) an energy absorption of at least about 85% when energy absorption is calculated according to the following formula $$\frac{(I.V.)^2 - (R.V.)^2}{(I.V.)^2}$$

wherein I.V. is impact velocity and R.V. is rebound velocity; (ii) an efficiency of at least about 50% wherein efficiency is defined as the fraction of the area of a plot of impact load versus penetration depth up to a maximum penetration depth relative a maximum area defined by achieving maximum impact load throughout penetration depth up to the maximum penetration depth; and (iii) for a given penetration depth, a ratio of a first compressive force at an impact velocity of 15 m.p.h. to a second compressive force at 0.004 m.p.h. of at least about 4.

The term "recoverable", when used throughout this specification to describe a polyurethane foam, is intended to mean a foam which deform or compress in response to impact and mean a foam which will deform or compress in response to impact and thereafter recover to substantially the original shape or form of the foam. Practically, the foam will recover to substantially the original shape or form within 1 to 12 hours, preferably within 30 minutes, of the impact.

The present polyurethane foam exhibits energy absorbing properties which, heretofore, do not appear to have been achieved in prior art polyurethane foams. Specifically, upon impact, the present polyurethane foam will exhibit a combination of three energy absorbing properties.

First, the present polyurethane foams will exhibit an impact energy absorption of at least about 85%, preferably an impact energy absorption of at least about 90%, more preferably an impact energy absorption in the range of from about 90% to about 98%. Impact energy absorption is calculated using the formula discussed above which includes impact velocity and rebound velocity. Prior art recoverable polyurethane foams have an energy absorption in the range of about 70% to about 80%. Prior art crushable foams have an energy absorption in the range of from about 90% to about 95%. Thus, while the present polyurethane foam has an energy absorption which is similar to that of prior art crushable foams, the present polyurethane foam possess the added advantage of being recoverable.

Second, the present polyurethane foams will exhibit an efficiency of at least about 50%, preferably an efficiency of at least about 60%, more preferably an efficiency in the range of from about 65% to about 90%. Efficiency is calculated from a stress-strain curve which is a plot of compressive force (also known as impact load or impact force) versus relative penetration depth of the foam (also known deflection). Generally, the flatter the stress-strain curve, the higher the efficiency of the foam. A foam having an efficiency of 100% (this foam is theoretical) would have characteristic stress-strain "curve" in the shape of a box whose boundries, for a given impact speed or velocity are defined by the maximum compressive force from zero to maximum relative penetration. The efficiency of a particular foam is determined by assessing the area under the stress-strain curve as a fraction of the area under the stress-strain "curve" for a foam having an efficiency of 100% as follows:

$$\frac{\text{Area under curve for specific foam}}{\text{Area under curve for 100\% efficiency foam}} \times 100\%$$

This parameter will be discussed in more detail in the Examples provided hereinbelow. Prior art recoverable polyurethane foams have an efficiency in the range of about 40% to about 43%. Prior art crushable foams have an efficiency in the range of from about 60% to about 70%. Thus, while the present polyurethane foam has an efficiency which is similar to that of prior art crushable foams, the present polyurethane foam possess the added advantage of being recoverable.

Third, the present polyurethane foam is capable of absorbing compressive forces which are directly proportional to impact velocity. More specifically, for a given penetration depth, the ratio of a first compressive force at an impact velocity of 15 m.p.h. to a second compressive force at an impact velocity of 0.004 m.p.h. is at least about 4, preferably at least about 6, more preferably in the range of from about 6 to about 20, even more preferably in the range of from about 8 to about 15, most preferably in the range of from about 10 to about 15. To the knowledge of Applicant, this property does not exist in any prior art polyurethane foam. Further, this is the property which Dr. Germane taught would be desirable in energy absorbing foam.

The present polyurethane foam preferably exhibit a fourth characteristic energy absorbing property. Applicant has discovered that the present polyurethane foam exhibits a unique quasi-styptic Compression Force Deflection (CFD). Specifically, for a given foam subjected to impact at an impact velocity of 0.004 m.p.h.:

(i) the ratio of compressive force at 50% deflection ( i.e. relative penetration depth) to that at 10% deflection is less than about 1.4; and (ii) the ratio of compressive force at 70% deflection (i.e. relative penetration depth) to that at 10% deflection is less than about 2.8.

The preferred polyurethane foam in accordance with the present invention possesses each of the foregoing four energy absorbing properties. To the knowledge of Applicant, a polyurethane foam possessing such a combination of properties was heretofore unknown.

Embodiments of the present invention will now be described with reference to the following Examples which should not be construed as limiting the scope of the invention. The term "pbw" used in the Examples refers to parts by weight.

In the Examples the following compounds were used:

1. DABCO BL-11, an amine polymerization catalyst commercially available from Air Products and Chemicals, Inc.;

2. DABCO-33LV, an amine polymerization catalyst commercially available from Air Products and Chemicals, Inc.;

3. DABCO 1027, an amine polymerization catalyst commercially available from Air Products and Chemicals, Inc.;

4. HEXCHEM 977, an organometallic catalyst (potassium octoate) in dipropylene glycol;

5. POLYCAT 5, an amine polymerization catalyst commercially available from Air Products and Chemicals, Inc.;

6. TEGOSTAB B-4690, a silicon surfactant commercially available from Goldschmidt;

7. DABCO DC 193, a silicon surfactant commercially available from Air Products and Chemicals, Inc.;

8. PLURACOL 975, a polyol having an equivalent weight of 140 (molecular weight: 620) and a hydroxyl number of about 400, commercially available from BASF Corporation;

9. NIAX LHT-240, a polyol having an equivalent weight of 241 (molecular weight: 723), commercially available from Arco Chemical Company;

10. NIAX E-351, a polyol having an equivalent weight of 1400 (molecular weight: 2800), commercially available from Arco Chemical Company;

11. NIAX 34-28, a polymer polyol having an equivalent weight of 2000, commercially available from Arco Chemical Company;

12. RUBIFLEX 7400, a modified MDI, commercially available from ICI Americas, Inc; and 13. LUPRANATE M-20S, a crude MDI, commercially available from BASF Corporation.

EXAMPLE 1

In this Example, a foam in accordance with the present invention was produced. The general formulation used is provided in Table 1. As will be apparent to those of skill in the art, the formulation in Table comprises a mixture of three polyols which are used in respective amounts to provide an average equivalent weight of 589. As will be further apparent to those of skill in the art, the isocyanate is used in an amount to provide an isocyanate index of 90.

The polyurethane foam was prepared by initially preparing a resin blend comprising all ingredients except the isocyanate. The resin blend and the isocyanate were allowed to equilibrate to a temperature of 77° F. The resin blend and isocyanate were independently fed to a high pressure mixhead at a pressure of approximately 3000 psi. The mixhead was operated to provide a throughput of approximately 150 grams reaction mixture per second. The reaction mixture emanating from the mixhead was dispensed into a preheated (130° F.) mold having the following dimensions: 16"×16"× 4". The mold was thereafter closed and the contained reaction mixture was allowed to expand to fill the mold. After approximately 3 minutes the foam product was demolded. The foam had a density of 4.5 pcf (pounds per cubic foot).

TABLE 1

| Ingredient | Amount (pbw) |
| --- | --- |
| NIAX LHT-240 | 78.3 |
| NIAX E-351 | 5.4 |
| NIAX 31-28 | 16.2 |
| B-4690 | 0.55 |
| DABCO 1027 | 0.2 |
| DABCO BL-11 | 0.2 |
| DABCO 33-LV | 0.55 |
| $H_2O$ | 3.25 |
| RUBIFLEX 7400 | 91.6 |

Test samples were cut from the foam product and subjected to impact testing. Impact testing comprised dynamic impact testing and quasi-static impact testing.

Dynamic impact testing was conducted on an apparatus commercially available from Defiance, Inc. as an "E-447 HEADREST IMPACT TEST SYSTEM". Generally, the apparatus is a hydraulically accelerated pendular impact apparatus having a center of mass weight of about 15 pounds. The apparatus was modified to include: (i) an LVDT to record arm position during the impact event, and (ii) a triple range accelerometer. The LVDT is a Schaevitz Model #2132 and the accelerometer is a PCB Model #302M42. The impactor shape used was a 7" round flat plate. During dynamic impact testing, the apparatus was set to provide an impact velocity of 15 m.p.h. The foam sample size used was 4"×4"×4".

The stress-strain curve obtain during dynamic impact testing of the foam product produced in this Example is illustrated in FIG. 1. The impact velocity recorded was 15.04 m.p.h. and the rebound velocity recorded was 3.96 m.p.h. to yield, using the formula provided above, an energy absorbance of 93.1%. The dashed line in FIG. 1 illustrates the stress-strain "curve" for a foam having an efficiency of 100%. By measuring the area under the recorded stress-strain curve assessing it relative the area under the stress-strain "curve" for the 100% efficient foam, it is apparent that the foam produced in the Example has an efficiency of approximately 65.6%.

Quasi-static impact testing was conducted at an impact velocity of 0.004 m.p.h. pursuant to ASTM 1621. The sample size used was 2"×2"×2".

The results of quasi-static and dynamic impact testing at specific penetration depths or deflections is reported in Table 2.

TABLE 2

| Deflection | Load A (psi) | Load B (psi) | B/A |
|---|---|---|---|
| 10% | 5.08 | 34.7 | 6.83 |
| 50% | 6.96 | 46.8 | 6.72 |
| 70% | 14.06 | — | — |

In Table 2, Load A is the compressive load measured during an impact velocity of 0.004 m.p.h. (i.e. quasi-static testing) and Load B is the compressive load measured during an impact velocity of 15 m.p.h. The results provided in Table 2 clearly support the conclusion that, for a given deflection, there is approximately a seven-fold increase in compressive load when the impact velocity is increased from 0.004 m.p.h. to 15 m.p.h.

Further, the quasi-static CFD discussed above for foam produced in this Example is as follows:

| | CFD |
|---|---|
| 50% Deflection/10% Deflection | 1.37 |
| 70% Deflection/10% Deflection | 2.77 |

The combination of the foregoing energy absorbing properties render the foam produced in this Example particularly useful in applications where energy absorption or management are required.

EXAMPLE 2

In this Example, a crushable polyurethane foam was produced. As will be apparent to those of skill in the art, the crushable polyurethane foam of this Example is outside the scope of the invention and is provided for comparative purposes only. The general formulation used is provided in Table 3. As will be apparent to those of skill in the art, the formulation in Table comprises a single polyol which provides an average equivalent weight of 143. As will be further apparent to those of skill in the art, the isocyanate is used in an amount to provide an isocyanate index of 90.

TABLE 3

| Ingredient | Amount (pbw) |
|---|---|
| PLURACOL 975 | 100.0 |
| DABCO DC 193 | 0.5 |
| POLYCAT 5 | 0.6 |
| HEXACHEM 977 | 1.0 |
| GLYCERIN | 10.0 |
| $H_2O$ | 9.0 |
| LUPRANATE M-20S | 242.4 |

The polyurethane foam in this Examples was produced using the methodology provided in Example 1 above. The foam produced in this Example was then subjected to quasi-static and dynamic impact testing as described in Example 1 above.

Figure 2:
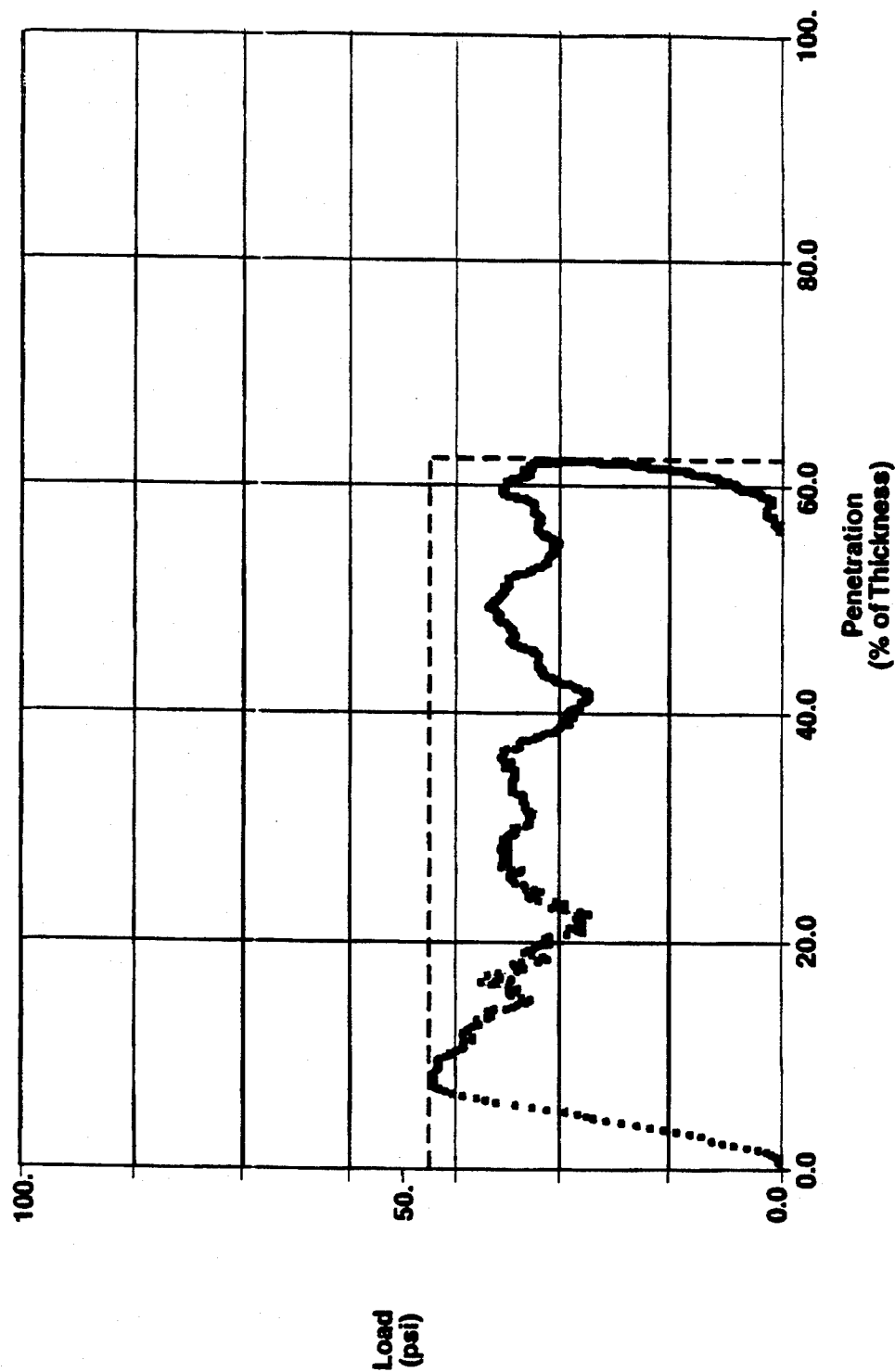
FIG. 2 is a stress-strain curve for a crushable polyurethane foam outside the scope of the present invention.

The stress-strain curve obtain during dynamic impact testing of the foam product produced in this Example is illustrated in FIG. 2. The impact velocity recorded was 15.21 m.p.h. and the rebound velocity recorded was 2.29 m.p.h. to yield, using the formula provided above, an energy absorbance of 97,7%. The dashed line in FIG. 2 illustrates the stress-strain "curve" for a foam having an efficiency of 100%. By measuring the area under the recorded stress-strain curve assessing it relative the area under the stress-strain "curve" for the 100% efficient foam, it is apparent that the foam produced in the Example has an efficiency of approximately 69.2%.

The results of quasi-static and dynamic impact testing at specific penetration depths or deflections is reported in Table 4.

TABLE 4

| Deflection | Load A (psi) | Load B (psi) | B/A |
|---|---|---|---|
| 10% | 28.9 | 42.0 | 1.45 |
| 50% | 31.9 | 37.2 | 1.16 |
| 70% | 56.0 | — | — |

In Table 4, Load A is the compressive load measured during an impact velocity of 0.004 m.p.h. (i.e. quasi-static testing) and Load B is the compressive load measured during an impact velocity of 15 m.p.h. The results provided in Table 4 clearly support the conclusion that, for a given deflection there is substantially no increase or an actual decrease in compressive load when the impact velocity is increased from 0.004 m.p.h. to 15 m.p.h. This is the disadvantageous property referred to by Dr. Germane relating to the potential for increased passenger injury during low velocity impacts at relatively high compressive loads.

Further, the quasi-static CFD discussed above for foam produced in this Example is as follows:

| | CFD |
|---|---|
| 50% Deflection/10% Deflection | 1.10 |
| 70% Deflection/10% Deflection | 1.94 |

The the non-recoverability and inability to absorb compressive loads directly proportional to the impact velocity render the foam produced in this Example clearly inferior in energy absorbing characteristics compared to the foam produced in Example 1.

EXAMPLE 3

In this Example, a recoverable polyurethane foam was produced. As will be apparent to those of skill in the art, the recoverable polyurethane foam of this Example is outside the scope of the invention and is provided for comparative purposes only. The general formulation used is provided in Table 5. As will be apparent to those of skill in the art, the formulation in Table comprises a mixture of a single polymer polyol and a low molecular diol (i.e. ethylene glycol) which provides an average equivalent weight of 1868. As will be further apparent to those of skill in the art, the isocyanate is used in an amount to provide an isocyanate index of 100.

TABLE 5

| Ingredient | Amount (pbw) |
| --- | --- |
| NIAX 34-28 | 100.0 |
| ETHYLENE GLYCOL | 7.2 |
| DABCO-33LV | 0.65 |
| DABCO B-11 | 0.15 |
| TEGOSTAB B-4690 | 0.55 |
| H$_2$O | 2.45 |
| LUPRANATE M-20S | 74.1 |

Figure 3:
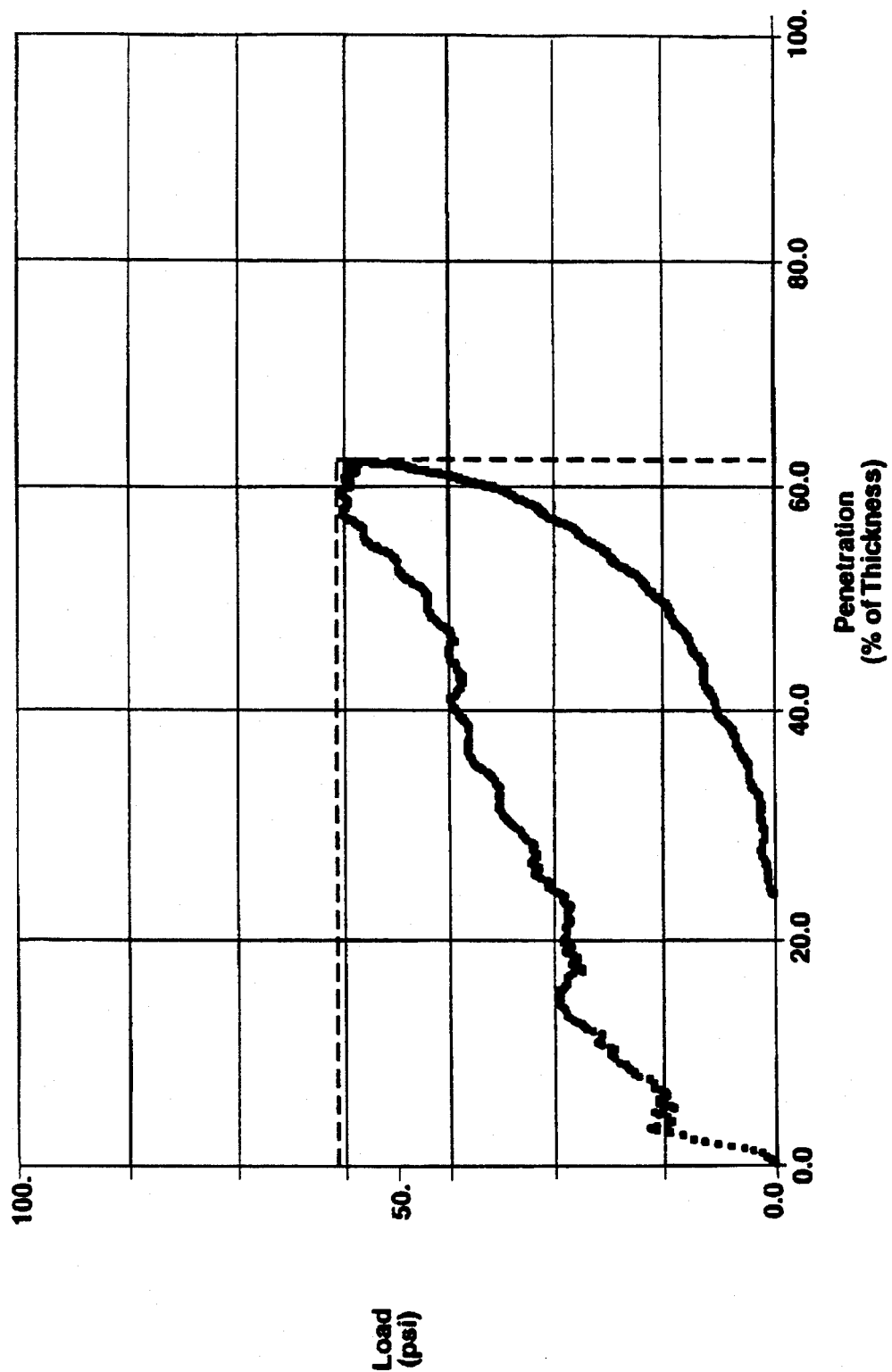
FIG. 3 is a stress-strain curve for a recoverable polyurethane foam outside the scope of the present invention.

The polyurethane foam in this Examples was produced using the methodology provided in Example 1 above. The foam produced in this Example was then subjected to quasi-static and dynamic impact testing as described in Example 1 above. The stress-strain curve obtain during dynamic impact testing of the foam product produced in this Example is illustrated in FIG. 3. The impact velocity recorded was 15.27 m.p.h. and the rebound velocity recorded was 7.37 m.p.h. to yield, using the formula provided above, an energy absorbance of 76.7%. The dashed line in FIG. 3 illustrates the stress-strain "curve" for a foam having an efficiency of By measuring the area under the recorded stress-strain curve assessing it relative the area under the stress-strain "curve" for the 100% efficient foam, it is apparent that the foam produced in the Example has an efficiency of approximately 42.1%.

The results of quasi-static and dynamic impact testing at specific penetration depths or deflections is reported in Table 6.

TABLE 6

| Deflection | Load A (psi) | Load B (psi) | B/A |
| --- | --- | --- | --- |
| 10% | 12.66 | 21.4 | 1.69 |
| 50% | 23.55 | 46.0 | 1.95 |
| 70% | 52.17 | — | — |

In Table 6, Load A is the compressive load measured during an impact velocity of 0.004 m.p.h. (i.e. quasi-static testing) and Load B is the compressive load measured during an impact velocity of 15 m.p.h. The results provided in Table 4 clearly support the conclusion that, for a given deflection there is substantially no increase or an actual decrease in compressive load when the impact velocity is increased from 0.004 m.p.h. to 15 m.p.h. This is the disadvantageous property referred to by Dr. Germane relating to the potential for increased passenger injury during low velocity impacts at relatively high compressive loads.

Further, the quasi-static CFD discussed above for foam produced in this Example is as follows:

| | CFD |
| --- | --- |
| 50% Deflection/10% Deflection | 1.86 |
| 70% Deflection/10% Deflection | 4.29 |

The inability to absorb compressive loads directly proportional to the impact velocity and the large variance in CFD render the foam produced in this Example clearly inferior in energy absorbing characteristics compared to the foam produced in Example 1.

What is claimed is:

1. A recoverable, polyurethane foam which, upon impact, will exhibit the following properties: (i) an energy absorption of at least about 85% when energy absorption is calculated according to the following formula $$\frac{(I.V.)^2 - (R.V.)^2}{(I.V.)^2}$$

wherein I.V. is impact velocity and R.V. is rebound velocity; (ii) an efficiency of at least about 50%, wherein efficiency is defined as a percent fraction of a ratio of a square wave to the area under a curve obtained by plotting compressive force versus relative penetration depth during the impact; and (iii) for a given penetration depth, a ratio of a first compressive force at an impact velocity of 15 m.p.h. to a second compressive force at 0.004 m.p.h. of at least about 4.

2. The polyurethane foam defined in claim 1, wherein the energy absorption is at least about 90%.

3. The polyurethane foam defined in claim 1, wherein the efficiency is at least about 60%.

4. The polyurethane foam defined in claim 1, wherein the ratio is at least about 6.

5. The polyurethane foam defined in claim 1, wherein the ratio is in the range of from about 6 to about 20.

6. The polyurethane foam defined in claim 1, wherein the ratio is in the range of from about 8 to about 15.

7. The polyurethane foam defined in claim 1, the is further characterized, at an impact velocity of 0.004 m.p.h., by:
   (i) a first ratio of a compressive force at 50% deflection to a compressive force at 10% deflection less than about 1.4; and
   (ii) a second ratio of a compressive force at 70% deflection the compressive force at 10% deflection less than about 2.8.

8. A vehicular interior trim panel comprising the polyurethane foam defined in claim 1.

* * * * *